(12) United States Patent
Eker et al.

(10) Patent No.: US 8,887,138 B2
(45) Date of Patent: Nov. 11, 2014

(54) DEBUGGING IN A DATAFLOW PROGRAMMING ENVIRONMENT

(75) Inventors: Johan Eker, Lund (SE); Harald Gustafsson, Lund (SE); Song Yuan, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 77 days.

(21) Appl. No.: 13/481,763

(22) Filed: May 25, 2012

(65) Prior Publication Data

US 2013/0318500 A1 Nov. 28, 2013

(51) Int. Cl.
*G06F 9/44* (2006.01)

(52) U.S. Cl.
USPC ........... 717/125; 717/119; 717/124; 717/127; 717/128

(58) Field of Classification Search
None
See application file for complete search history.

(56) References Cited

U.S. PATENT DOCUMENTS

| | | | |
|---|---|---|---|
| 5,038,348 A | 8/1991 | Yoda et al. | |
| 5,165,036 A | 11/1992 | Miyata et al. | |
| 5,452,437 A | 9/1995 | Richey et al. | |
| 5,511,215 A | 4/1996 | Terasaka et al. | |
| 5,652,909 A * | 7/1997 | Kodosky | 717/125 |
| 5,913,055 A | 6/1999 | Yoshida et al. | |
| 6,353,924 B1 * | 3/2002 | Ayers et al. | 717/128 |
| 6,378,066 B1 | 4/2002 | Lewis | |
| 6,460,059 B1 * | 10/2002 | Wisniewski | 715/212 |
| 6,732,354 B2 * | 5/2004 | Ebeling et al. | 717/119 |
| 7,155,708 B2 | 12/2006 | Hammes et al. | |
| 7,761,272 B1 | 7/2010 | Janneck et al. | |
| 8,146,040 B1 * | 3/2012 | Janneck et al. | 716/116 |
| 8,271,955 B1 * | 9/2012 | Lindahl et al. | 717/128 |
| 8,302,079 B2 * | 10/2012 | Bansal | 717/127 |
| 8,468,501 B2 * | 6/2013 | Subhraveti | 717/125 |
| 2002/0157086 A1 * | 10/2002 | Lewis et al. | 717/127 |
| 2004/0117769 A1 * | 6/2004 | Lauzon et al. | 717/125 |
| 2004/0268310 A1 * | 12/2004 | Morgan | 717/124 |
| 2006/0206869 A1 | 9/2006 | Lewis et al. | |
| 2012/0005658 A1 * | 1/2012 | Bansal | 717/128 |
| 2012/0096441 A1 * | 4/2012 | Law et al. | 717/127 |

OTHER PUBLICATIONS

Lucarz, C., Dataflow Programming for Systems Design Space Exploration for Multicore Platforms, EPFL, 2011, 7 pages, [retrieved on Sep. 25, 2013], Retrieved from the Internet: <URL:http://infoscience.epfl.ch/record/165393>.*

Janneck, J., et al., Profiling Dataflow Programs, IEEE International Conference on Multimedia and Expo, 2008, pp. 1065-1068, [retrieved on Jun. 26, 2014], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — Leffler Intellectual Property Law, PLLC

(57) ABSTRACT

A dataflow program defining actors that pass tokens from one to another via connections is processed by causing one or more processors to access and execute instructions of the dataflow program. As instructions of the dataflow program are being executed, a first set of trace records is created that represents a sequence of events (e.g., token production/consumption, actor state change, or action firing). A first subset of the trace records is displayed and one of these is selected. The first set is processed to identify, based on definitions specified by the dataflow program, a second set of trace records, of which a subset is displayed.

19 Claims, 7 Drawing Sheets

(56) References Cited

OTHER PUBLICATIONS

Bauman, N., et al., A Methodology for Debugging Data Flow Programs, Massachusetts Institute of Technology, Dec. 12, 1981, 19 pages, [retrieved on Jun. 26, 2014], Retrieved from the Internet: <URL:http://csg.csail.mit.edu/pubs/memos/Memo-219/Memo-219.pdf/>.*

Advanced LabVIEW Debugging: Profiling VI Execution With the LabVIEW Desktop Execution Trace Toolkit, National Instruments, Mar. 8, 2012, 4 pages, [retrieved on Jun. 26, 2014], Retrieved from the Internet: <URL:http://www.ni.com/white-paper/8083/en/>.*

Yamana, H. et al. "An Environment for Dataflow Program Development of Parallel Processing System-Harray" Systems and Computers in Japan, Jan. 1, 1991, Wiley, Hoboken, NJ, US, vol. 22, No. 8, pp. 26-38.

Eker, J. et al. "CAL Language Report: Specification of the CAL actor language" Technical Memorandum No. UCB/ERL M03/48, University of California, Berkeley, CA, 94720, USA, Dec. 1, 2003.

Siret, N. et al. "Hardware Code Generation from Dataflow Programs" author manuscript published in Design and Architectures for Signal and Image Processing (DASIP), 2010 Conference on, United Kingdom (2010) DOI: 10.1109/DASIP.2010.5706254, hal-00565300, version 1—Feb. 11, 2011.

Bhattacharyya, S. et al. "Overview of the MPEG Reconfigurable Video Coding Framework" Journal of Signal Processing Systems DOI 10.1007/s11265-009-0399-3, 2009 Springer Science + Business Media LLC, US. Published online: Jul. 25, 2009.

Lagalaye, P.L. et al. "Debug and development support tools for RVC CAL" International Organisation for Standardisation, ISO/IEC JTC1/SC29/WG11 Coding of Moving Pictures and Audio, Jul. 2010, Geneva, Switzerland.

"GDB: The GNU Project Debugger" URL:http://www.gnu.org/software/gdb, pp. 1-3; downloaded May 23, 2012, last modified Apr. 26, 2012.

"Reverse Debugging with GDB" from Wikipedia URL:http://sourceware.org/gdb/wiki/ReverseDebug, pp. 1-2; downloaded May 22, 2012, last edited Sep. 28, 2009 by Michael Snyder.

* cited by examiner

DEBUGGING IN A DATAFLOW PROGRAMMING ENVIRONMENT

BACKGROUND

The present invention relates to dataflow programming environments, and more particularly to debugging in a dataflow programming environment.

Dataflow modeling is emerging as a promising programming paradigm for streaming applications for multicore hardware and parallel platforms in general. This more constrained programming model benefits high-level transformations and facilitates advanced code optimizations and run-time scheduling.

A dataflow program is made up of a number of computational kernels, (called "actors" or "functional units") and connections that specify the flow of data between the actors. An important property of a dataflow program is that the actors only interact by means of the flow of data over the connections: there is no other interaction. In particular, actors do not share state. The absence of shared state makes a dataflow program relatively easy to parallelize: the actors can execute in parallel, with each actor's execution being constrained only by the requirement that all of its inputs be available.

FIG. 1 illustrates an exemplary graphical representation of a dataflow program 100 having seven actors, identified with respective reference numerals A, B, C, D, E, F, and G. The actors A, B, C, D, E, F, and G carry out their functions by means of their code (i.e., program instructions) being executed within a processing environment 101 that comprises one or more programmable processors 103 that retrieve program instructions and data from one or more non-transitory processor readable storage media (e.g., as represented by memory 105). Connections between the actors are indicated by arrows. The dataflow program 100 illustrates that an actor can have one or more input connections, and can have any number of output connections, including none. For example, actor G lacks any output ports, and is consequently commonly referred to as a "sink". A sink does not affect the state of the other actors. In practice, sinks typically represent interaction with the environment in which the dataflow program executes. For example, a sink could represent an actuator, an output device, or the like. A sink could also represent a system that has not yet been implemented, in which case the sink mimics the missing subsystem's demand for input.

Feedback loops can be formed as illustrated in this example by actors C, D, E, and F forming a cycle, and also by actor B having a self-loop. It will be observed that feedback limits parallelism, since an actor's firing (i.e., its execution) may have to await the presence of input data derived from one of its earlier firings.

Communication between actors occurs asynchronously by means of the passing of so-called "tokens", which are messages from one actor to another. This type of programming model is a natural fit for many traditional Digital Signal Processing (DSP) applications such as, and without limitation, audio and video coding, radio baseband algorithms, cryptography applications, and the like. Dataflow in this manner decouples the program specification from the available level of parallelism in the target hardware since the actual mapping of tasks onto threads, processes and cores is not done in the application code but instead in the compilation and deployment phase.

In a dataflow program, each actor's operation may consist of a number of actions, with each action being instructed to fire as soon as all of its required input tokens become valid (i.e., are available) and, if one or more output tokens are produced from the actor, there is space available in corresponding output port buffers. Whether the firing of the action occurs as soon as it is instructed to do so or whether it must nonetheless wait for one or more other activities within the actor to conclude will depend on resource usage within the actor. Just as the firing of various actors within a dataflow program may be able to fire concurrently or alternatively may require some sort of sequential firing based on their relative data dependence on one another, the firing of various actions within an actor can either be performed concurrently or may alternatively require that some sequentiality be imposed based on whether the actions in question will be reading or writing the same resource; it is a requirement that only one action be able to read from or write to a resource during any action firing.

An input token that, either alone or in conjunction with others, instigates an action's firing is "consumed" as a result (i.e., it ceases to be present at the actor's input port). An actor's actions can also be triggered by one or more state conditions, which include state variables combined with action trigger guard conditions and the action scheduler's finite state machine conditions. Guard conditions may be Boolean expressions that test any persistent state variable of the actor or its input token. (A persistent state variable of an actor may be modeled, or in some cases implemented, as the actor producing a token that it feeds back to one of its input ports.) One example (from among many) of a dataflow programming language is the CAL language that was developed at UC Berkeley The CAL language is described in "CAL Language Report: Specification of the CAL actor language", Johan Eker and km W. Janneck, Technical Memorandum No. UCB/ERL M03/48, University of California, Berkeley, Calif., 94720, USA, Dec. 1, 2003, which is hereby incorporated herein by reference in its entirety. In CAL, operations are represented by actors that may contain actions that read data from input ports (and thereby consume the data) and that produce data that is supplied to output ports.

Typically, the data passing between actors is modeled as a First-In-First-Out (FIFO) buffer, such that an actor that is sourcing data pushes its data into a FIFO and an actor that is to receive the data pops the data from the FIFO. An important characteristic of a FIFO is that it preserves the order of the data contained therein; the reader of the FIFO receives the data in the same order in which that data was sent to the FIFO. Also, actors are typically able to test for the presence of data in a FIFO connected to one of the actor's input ports without having to actually pop that data (and thereby remove the data from the FIFO).

The interested reader may refer to U.S. Pat. No. 7,761,272 to Janneck et al., which is hereby incorporated herein by reference in its entirety. The referenced document provides an overview of various aspects of dataflow program makeup and functionality.

It will be appreciated from the above discussion that dataflow driven execution is different from the more traditional control flow execution model in which a program's modules (e.g., procedures, subroutines, methods) have a programmer-specified execution order.

Regardless of which execution model is followed, complex programs will almost always require that the programmer have some type of mechanism for finding errors (so-called "bugs") in the program. Debugging tools are available for this purpose. Control flow debugging methods typically keep a context for a function. When a function call is made (i.e., when the function is invoked for execution by the processor(s)), the context of the calling function is placed on a stack. Hence, if a break point is reached (i.e., a programmerdesignated point in a program at which program execution should halt), it is possible to inspect calling contexts on the stack.

Another quite recent feature in connection with control flow debugging is to give the user the experience of being able to "un-execute" the control flow in reverse order. Since programs do not really operate backwards, this illusion is created by keeping a record of all machine instructions executed and of all register and memory changes. Register and memory contents, as well as machine instruction pointers are then reverted in reverse order that corresponds to a certain point in the control flow. Such a feature has been available in a debugger called GDB ("GNU debugger") since release 7.0. The interested reader is directed to information made available on the World Wide Web at http://www.gnu.org/s/gdb and at http://sourceware.org/gdb/wiki/ReverseDebug for more on this topic.

Despite the existence of tools such as those described above, the debugging of dataflow programs has presented its own problems. One common way of executing dataflow programs is to utilize a runtime system that is implemented using a control flow execution model. This runtime system is responsible for parts of the scheduling of the execution of the dataflow actions on the processor(s) and potentially also for handling the FIFO queues. When debugging the dataflow program using a debugger based on a conventional control flow execution model, it is necessary to debug the dataflow program in conjunction with the runtime system. For traditional control flow programs, the utilization of a context stack whenever a program is halted makes it easy to examine from what code segment the current function was called as well as the variables and other information in that context, backwards up the context stack. However, the inventors have ascertained that, since a dataflow program is driven by the presence of data and by function calls, such control flow debuggers are inadequate at least because they do not make it possible to trace dataflow concepts such as tokens nor do they enable reversion of an actor to a previous state synchronized with the data tokens.

It is therefore desirable to have improved tools for debugging dataflow programs to eliminate the shortcomings of conventional techniques.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for processing a dataflow program that defines one or more actors and one or more connections, wherein each connection passes a token from an output port of any one of the actors to an input port of any one of the actors. Such processing includes causing one or more processors to access and execute instructions of the dataflow program. As instructions of the dataflow program are being executed, a first set of trace records is created that represents a sequence of events, wherein each event is a token production by an actor, a token consumption by an actor, an actor state change, or an actor action firing. Information representative of a first subset of trace records from the first set of trace records is displayed. A first trace record is selected from the first subset of trace records, and the first set of trace records is processed to identify, based on definitions specified by the dataflow program, a second set of trace records from which the first trace record's existence depends. Information representative of a second subset of trace records is displayed, wherein the second subset of trace records is a subset of the second set of trace records.

In an aspect of some but not necessarily all embodiments, selecting the first trace record from the first subset of trace records includes displaying a graphical user interface on a display device, wherein the graphical user interface display includes a depiction of the first subset of trace records. Information indicative of a trace record depicted on the display device is received via the graphical user interface, and the indicated trace record depicted on the display device is used as the selected first trace record from the first subset of trace records. In some but not necessarily all of these embodiments, processing further includes displaying, via the graphical user interface, the information representative of the second subset of trace records in a manner that visually depicts an association between the selected first trace record and the second subset of the second set of trace records. And, in some but not necessarily all of these embodiments, processing further includes displaying, as part of the graphical user interface, one or more actors and one or more actor connections defined by the dataflow program; and displaying, as part of the graphical user interface, a depiction of the first trace record in closer proximity to a related one of the displayed actor connections than to all other displayed actor connections, wherein the first trace record represents a token that, during execution of the dataflow program, was produced to or consumed from the related actor connection. In some but not necessarily all embodiments, processing includes displaying, via the graphical user interface, information representative of a third subset of trace records that is different from the first and second subsets of trace records.

In an aspect of some but not necessarily all embodiments, processing includes displaying a graphical user interface on a display device, wherein: the graphical user interface display includes information representative of program code defining an action of an actor defined by the dataflow program; the first subset of trace records includes a record representing a token produced by a firing of the action of the actor; and the second subset of trace records includes a record representing a token that was a prerequisite of the firing of the action of the actor. In some but not necessarily all of these embodiments, the displayed graphical user interface further includes information representative of one or more actor state changes related to the action.

In an aspect of some but not necessarily all embodiments, the second subset of trace records includes a second trace record representing a prerequisite of the first trace record; and the second subset of trace records includes a third trace record representing a prerequisite of the second trace record.

In an aspect of some but not necessarily all embodiments, processing includes performing the selecting and processing steps for each of a plurality of actors that are defined by the dataflow program.

In an aspect of some but not necessarily all embodiments, processing the first set of trace records to identify, based on definitions specified by the dataflow program, the second set of trace records from which the first trace record's existence depends comprises any one or more of the following steps:
    using connections between various actors' output and input ports, as defined by the dataflow program, to derive dependencies between token production and token consumption, using one or more of action input definitions, output port definitions and token repetitions, as defined by the dataflow program, to derive dependencies between relationships between consumption of a token and production of the same or a different token, using one or more of actors' defined input ports and token repetitions and identifying actor state variables that change in a recorded actor state before and after action firing, as defined by the dataflow program, to derive dependencies between token consumption and actor state changes, and using an action's guard condition reading an actor state variable and an action's defined output port, as defined by the dataflow program, to derive dependencies between one or more actor state changes and token production.

DETAILED DESCRIPTION

Figure 1:
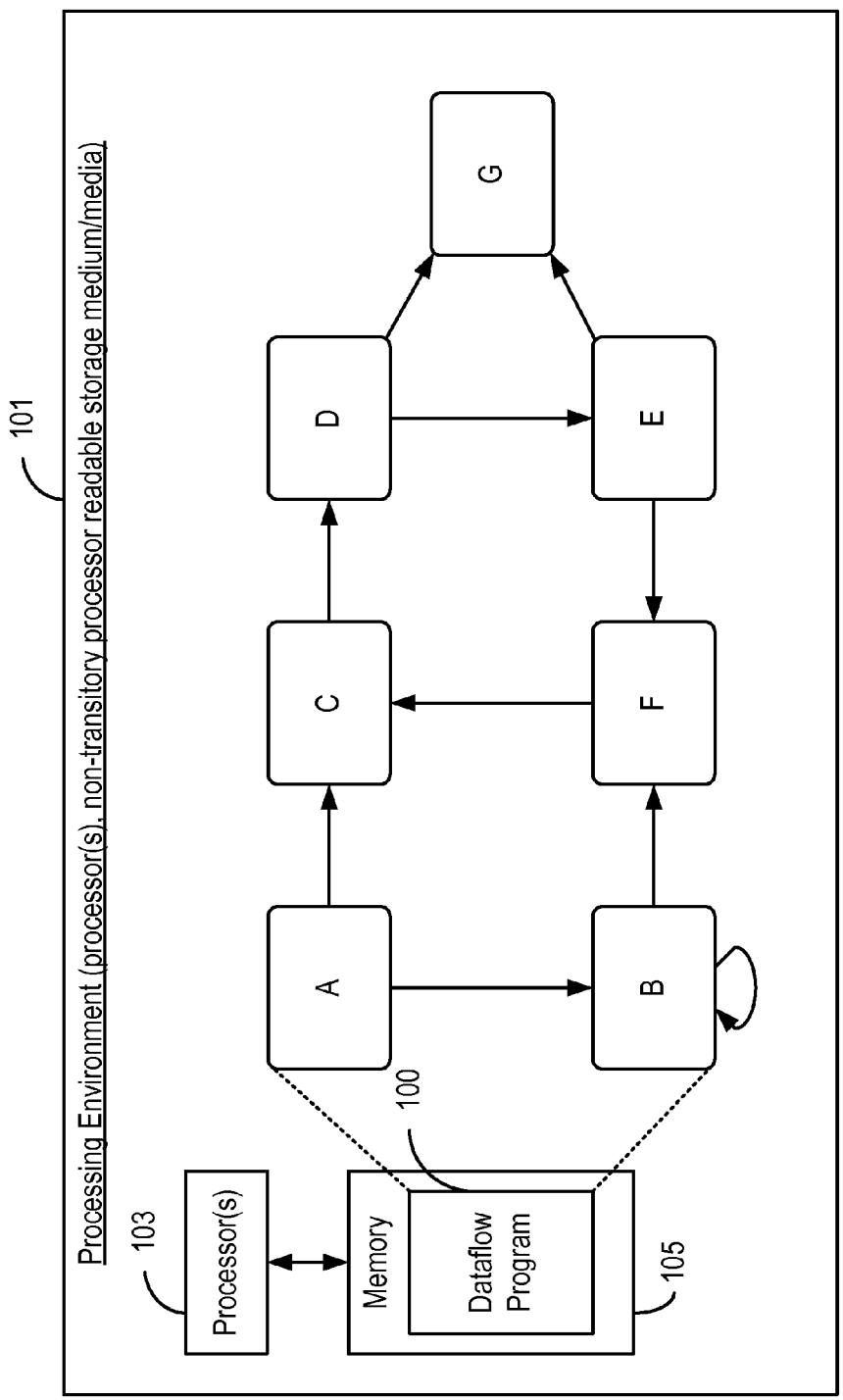
FIG. 1 illustrates an exemplary graphical representation of a dataflow program having seven actors.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a user/programmer (hereinafter simply referred to as "user") is provided with one or more dataflow debugging tools that enable the debugging of individual actors in a dataflow program and/or the debugging of a connected set of actors in a dataflow program.

Figure 2:
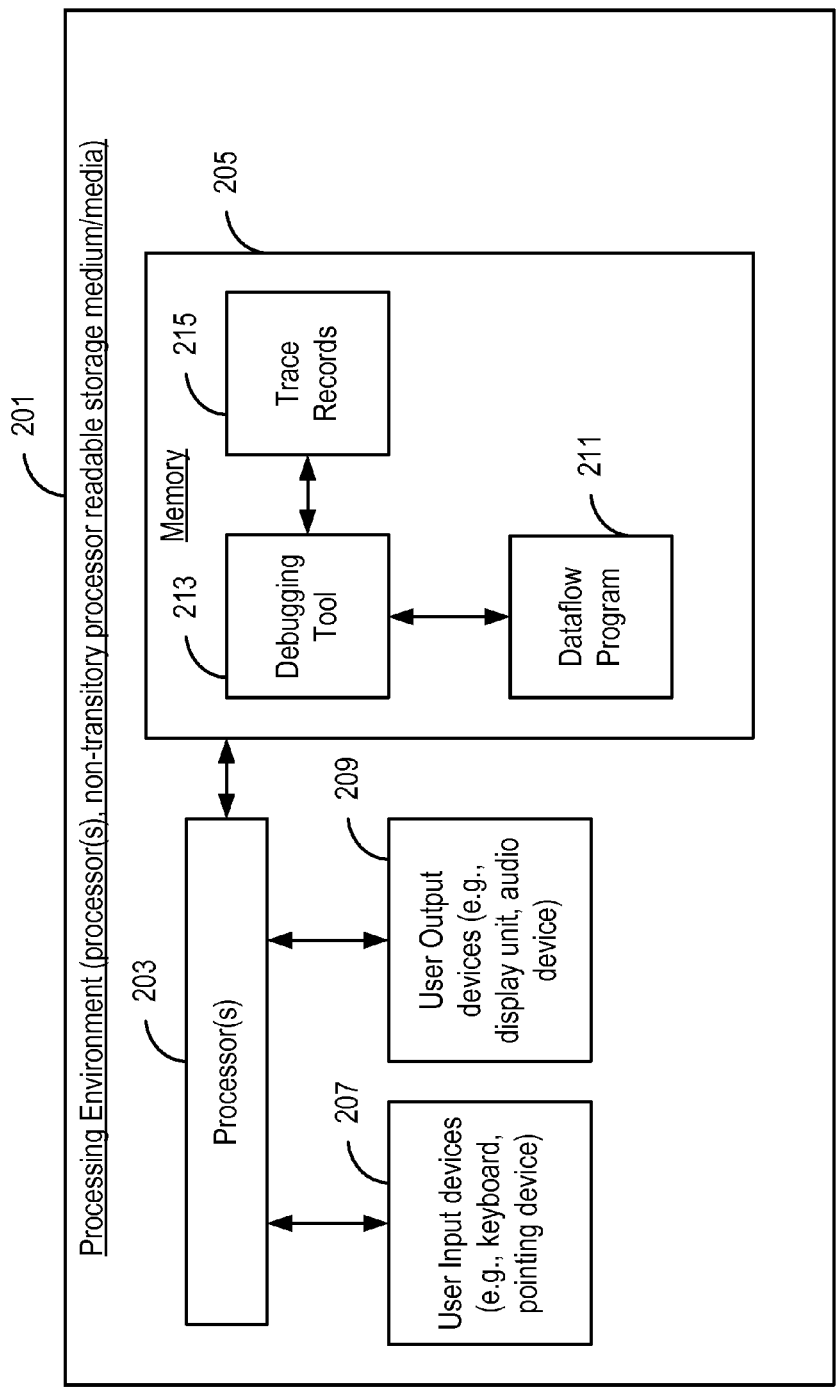
FIG. 2 is a block diagram showing an overall exemplary embodiment of a processing environment that includes elements for debugging a dataflow program.

FIG. 2 is a block diagram showing an overall exemplary embodiment. A processing environment 201 is provided that includes one or more processors 203 that can read from and store data into a non-transitory processor-readable storage medium such as the depicted memory 205. The memory 205 can be, for example and without limitation, any one or a combination of volatile and/or non-volatile storage devices such as electronic memory devices (e.g., Random Access Memory (RAM), Read Only Memory (ROM)), magnetic storage and optical storage. The processing environment 201 also includes one or more input devices 207 (e.g., one or more keyboards, a mouse or equivalent pointing device (e.g., touch screen, touchpad, trackball) and one or more output devices 209 (e.g., display unit).

The processor(s) 203 execute(s) program instructions that are read from the memory 205. The processor(s) 203 can also read data from and write data to the memory 205.

The memory 205 has stored therein a dataflow program 211 to be debugged. In some embodiments, the dataflow program 211 is embodied in its original high level of abstraction (e.g., it may be the dataflow program source code). In alternative embodiments, the dataflow program 211 may be embodied in a form generated by a dataflow program compiler. As such, the dataflow program can be at the same or a lower level (e.g., assembly language, object code, etc.) of abstraction as the original dataflow program source code.

A debugging tool 213 (e.g., in the form of a set of instructions that is executable by the processor(s) 203) is provided that is configured to work with the dataflow program 211 at a level of abstraction that corresponds to that of the dataflow program 211. For example, if the dataflow program 211 is stored in the form of source code, the debugging tool 213 may include a runtime simulator that is configured to simulate the execution of the dataflow program 211 (possibly including simulation of concurrent and asynchronous execution of the dataflow program's actors). At the other extreme, if the dataflow program 211 has been compiled into object code or comparable, then the debugging tool may be configured to interact with the dataflow program 211 as it is being run (e.g., via an instruction trap mechanism) and/or actually have some of its own instructions embedded into the object code so that debugging steps will be performed as the dataflow program 211 is executed within the processing environment 201.

An aspect of embodiments consistent with the invention includes the debugging tool creating and updating a set of trace records 215 that represent the sequence of tokens that are created and passed from one actor to another as well as a sequence of actor states and firings of the actor's action(s) as it is being executed (e.g., the sequence of computational steps performed by the actor as well as dependencies between computational steps). In particular, the trace records 215 capture sufficient information about token production/consumption, the ordering of tokens on connections between actors, actor state information (between action firings) and any other contextual information about tokens and state to be able to detect dependence between tokens and states within a dataflow network. By being able to, for example, determine what tokens were present and in what chronological order at various input ports throughout a dataflow network, a user can trace and find the cause of a faulty token being produced at an output port of one of the dataflow network's actors. For this purpose, all information in the trace records 215 should be associated with synchronized markers (e.g., timestamps or an atomic counter) to allow for reverting the state and tokens on a connection to match any situation before each action firing. In some but not necessarily all embodiments, for longer running debug sessions, sparser token data and actor state can be saved combined with only recording the action firing order. This allows any state and token data to still be reverted to by reverting to the earliest previous record and causing the action firings to be re-executed in the recorded order. In some but not necessarily all embodiments, the sparse recordings have a logarithmic time distribution by removing more and more recordings as they become older and older. When a reversion is made by means of re-execution as just described, the full record from the previous saved record is preferably retained in the trace records 215 because of the higher likelihood that a second reversion will be made by the user.

In another aspect of some but not necessarily all embodiments, the context of tokens and state can be altered and read by the debugging tool runtime directly (i.e., the debugger is an embedded part of the executable code) or by interacting with a standard control flow debugger applied to the dataflow program, or by the dataflow program being executed in a simulator/emulator with the token and/or state data being readable and possibly also alterable by means of an interface to the simulator/emulator.

Likewise, the execution of action firing in a specific order can be made by the debugging tool runtime, or by a control flow debugger (e.g., by altering the next firing in a firing loop), or in a simulator/emulator by handling the scheduling inside the simulator/emulator.

Any combination of the above possible embodiments can also be made (e.g., changing both the runtime and using a control flow debugger).

In some instances, execution of the dataflow program 211 may be uninterrupted at (or nearly at) normal execution speed. In other instances, the debugging tool 213 may be configured to enable the user to single step execution of one or more actors. The debugging tool 213 is able to later use the trace records 215 to recreate program states and tokens as part of the debugging process. In particular, the debugging tool 213 presents the user with information that is relevant to the firing of an actor. For example, having found a faulty token being produced at an output of one of the actors in a dataflow program, the tool is able to supply to the user (e.g., via a visual display) the values of tokens and states upon which production of the faulty token depended. It will be recognized that this is not time-centric, since, for example, a snapshot of all token values present and states in existence at a particular instant of time will not likely show what caused the faulty token to be produced. Rather, the information is dependency-driven, so that the user can start from the faulty token and work his/her way back in terms of causality to discover errors in a program. These and other aspects are described further in the following.

In one aspect, the debugging tool 213 is configured to interact with a user (e.g., via the input and output devices 207, 209) and, based on these interactions, to ascertain and provide to the user information that is useful for debugging an actor within a dataflow program. This includes information that enables the user to debug backwards and forwards in terms of actions/time. It is common for potential errors to be found by means of a potentially faulty token being produced (or no token being produced at all) at an output port of an actor. The user then needs to trace back from the potentially faulty token to whatever its cause(s) is/are.

Figure 3:
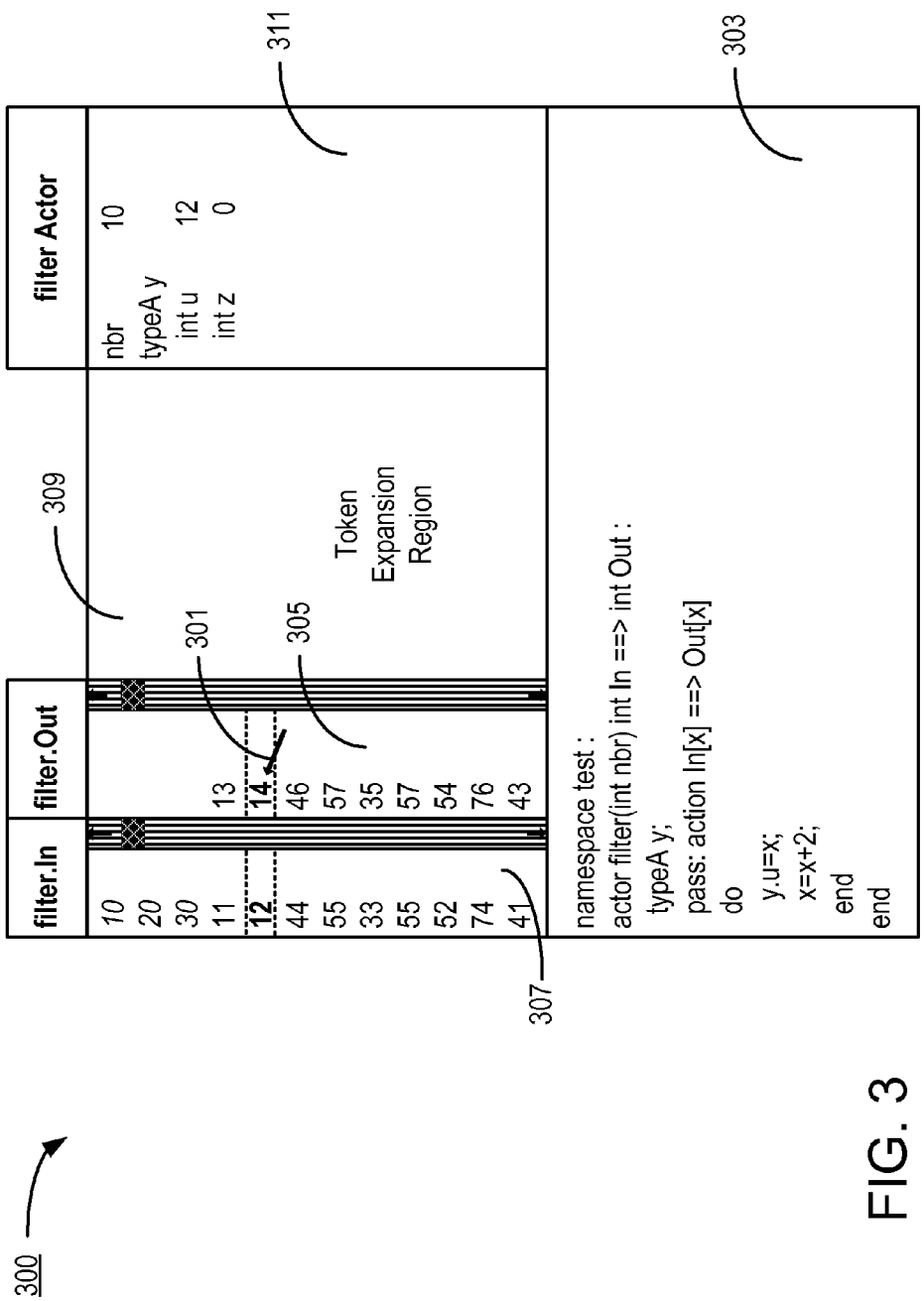
FIG. 3 depicts an exemplary graphical user interface 300 for the local debugging of an actor.

To enable this type of debugging, the debugging tool 213 is configured to provide the user with a user interface that allows the local debugging of an actor, whereby the user is made able to examine the actor's current state. FIG. 3 depicts an exemplary graphical user interface 300 for the local debugging of an actor. If a suspicious state is discovered or when investigating whether an actor's input tokens are at fault, the user can revert the actor's state and tokens on ports until an earlier point, such that all states and tokens presented to the user are synchronized with respect to their dependence from one another. This can be done local to the actor since the input tokens are coming from previously recorded tokens. When the faulty action firing is found it can be re-executed with debugging, for example by executing the action line-by-line to discover the exact expression that is producing the faulty result. The user can continue the execution from the halting position after manually correcting the fault.

Looking at the graphical user interface 300 more closely, it can be seen that an icon representing a pointer 301 is made visible to the user. Using any technique known in the art, the debugging tool 213 is configured to enable the user to move the pointer 301 within the display and to make selections of pointed-to items by means of manipulation of one or more of the input devices 207 (e.g., by moving a mouse and pressing mouse buttons).

The exemplary graphical user interface 300 is partitioned into different regions. One of these is a program region 303, which displays lines of code that the user is presently focusing his/her attention on.

Another region is an output token region 305. Alongside the output token region 305 are one or more input token regions. For the sake of simplicity, and without limitation, only one input toke region 307 is depicted in FIG. 3. Each of these regions is a scrollable list, as indicated by the scroll bars depicted on the right side of each of these regions. Scrolling one of the lists causes the corresponding list to be scrolled. For example, if the user scrolls the token output region 305 and selects a different token in that list, the debugging tool 213 causes the selected token's corresponding token(s) in the token input region(s) 307 to be displayed alongside it. Dependency structure information that the debugging tool 213 derives from the dataflow program 211 (discussed in further detail below) is used to process the trace record to derive the corresponding token for the token input region 307. The actor's state is also updated to be consistent, meaning that there is a chain of causality, such that, for example, the existence of a selected record representing an output token depends on preceding state(s) and input token(s) represented by earlier records. This set of consistent information is generally a subset of the trace records 215. The subset may be represented by the debugging tool 213 in any of a number of forms, including but not limited to stored copies of records from the trace records 215 or stored pointers to select ones of the trace records 215. By displaying information representative of the selected token in association with (e.g., alongside of) information representative of the consistent records, a user can see what input token(s) and/or state(s) was/were associated with production of the selected output token. The same works in reverse for a selected input token.

Token values indicated in bold font represent a current focus of the user. Token values indicated in italics are tokens that, at the time of program halt, were present in the input FIFO but had not yet been consumed. Consequently, it can be seen that, for the not-yet-consumed tokens, there are no corresponding output tokens. The use of bold and italics in the graphical user interface 300 are not essential features of the invention. Alternative methods of displaying this information to the user could be used instead. For example, a grayed font could be used instead of italics.

For the sake of simplifying the explanation, the example shown in FIG. 3 depicts tokens having only scalar values. However, tokens need not be scalars, but can be any type of data structure. To handle this situation, the exemplary graphical user interface 300 includes one or more token expansion regions 309. (Solely for the sake of simplifying the description, only one token expansion region 309 is depicted in this example.) When a token is selected in either the token output or token input regions 305, 307, the debugging tool 213 causes that token's expanded values to be displayed within the token expansion region 309. In some but not necessarily all embodiments, in such cases where token expansion is called for, the token output and token input regions 305, 307 display an index number where, for example, the number "0" represents a present token, negative index values represent past tokens, and positive index values represent future token values.

In some, but not necessarily all embodiments, instead of displaying index values for expandable tokens, compressed/partial values of the tokens' members (i.e., the constituent parts of a complex data structure) are displayed up to the width of the token output or token input region 305, 307. For example if an output token data structure contains several integer elements, then as many as will fit in the width of the token output region 305 is displayed, for example with commas or other character separating individual member values from one another. In some but not necessarily all of these embodiments, a horizontal scroll capability (not shown, but well known in the art of graphical user interfaces) allows all of the token member values to fit in this compressed form. The expanded view made available by the token expansion region 309 is still good for detailed examination, but the scroll list is good for comparing records.

In another aspect of some but not necessarily all embodiments consistent with the invention, the debugging tool 213 is configured to respond to user input directed at a displayed token value, such as "right-clicking" the token value, wherein the response includes displaying a context sensitive window of options that allow the user to navigate through the dataflow program. For example, right-clicking on an input token value can present the user with an option to switch to values and program code associated with the producing actor of the token value. Similarly, right-clicking on an output token value can present the user with an option to switch to values and program code associated with a consuming actor of the token value.

The exemplary graphical user interface 300 also includes an actor state region 311. The actor state region 311 displays actor state (or, equivalently, state change) information that has been recorded and stored within the trace records 215. Displayed state variable values are consistent with the selected token.

Figure 4:
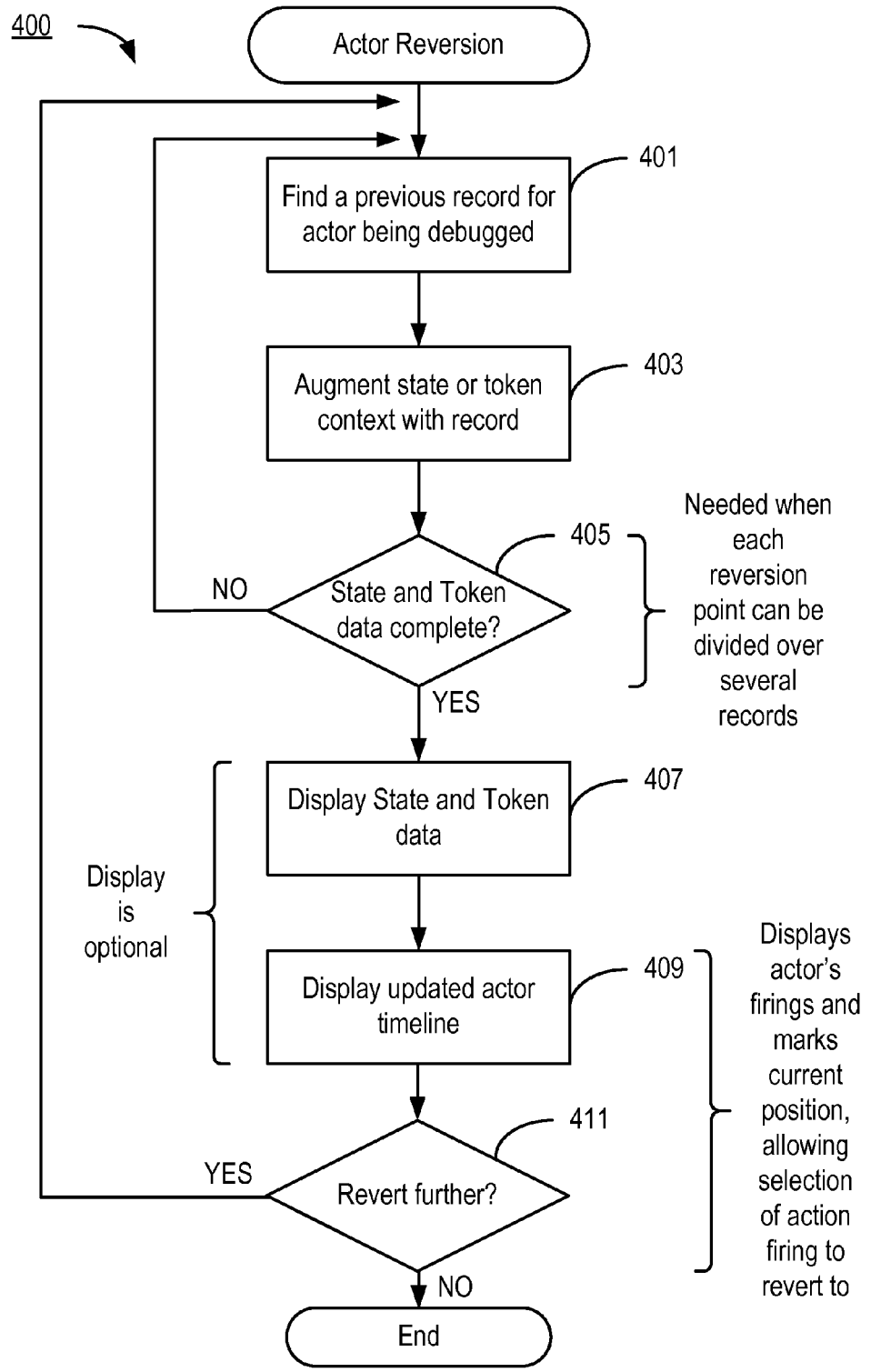
FIG. 4 is, in one respect, a flow chart of steps/processes performed by a debugging tool in accordance with some but not necessarily all exemplary embodiments of the invention.

FIG. 4 is, in one respect, a flow chart of steps/processes performed by a debugging tool 213 in accordance with some but not necessarily all exemplary embodiments of the invention. In another respect, FIG. 4 can be considered to depict exemplary means 400 comprising the various illustrated circuitry (e.g., hard-wired and/or suitably programmed processor) configured to perform the described functions.

In this exemplary embodiment, the debugging tool 213 is configured to facilitate debugging a single actor within a dataflow program that comprises an interconnected network of one or more actors. The illustrated portion begins with the debugging tool 213 finding a previous record for the actor being debugged (step 401). Selection of the actor being debugged can either be made directly by the user via, for example, a user interface such as the one described with reference to FIG. 3, or it can be made within the context of an entire dataflow network being debugged, as will be described in greater detail below.

Finding a previous record for the actor being debugged involves the debugging tool 213 processing the trace records 215 by looking through them to identify one associated with the actor being debugged. The purpose of finding this and possibly other trace records associated with the actor being debugged is for the debugging tool to construct, piece by piece, a complete consistent representation (e.g., in the memory 205) of token and state information (i.e., tokens on the actor's input ports and actor state should be those that result in production of the tokens on the actor's output ports.) Accordingly, a debugging tool representation of the actor's state or token is updated to reflect the information contained in the found record (state 403).

The processing of step 401 to decide which trace records 215 depend from one another is, in general, extracted from the dataflow description of an actor action's input and output ports, and connections between actor's ports and actor action's guard evaluated variables (e.g., token(s) and/or state variable(s)). The syntax of dataflow programming languages such as CAL make such information readily available, so that the debugging tool 213 can obtain it from the dataflow program 211 source code stored in the memory 205. Using the dataflow program's dependency structure information, the debugging tool 213:

uses defined connections between various actors' output and input ports to derive the dependencies between token production and token consumption;

uses action input and output port definitions and, when applicable, token repetition (i.e., the number of tokens that are read/written on a given port in order to trigger an action firing) to derive relationships between consumption of a token and production of a potentially different token uses actors' defined action input ports (and when applicable, token repetition as discussed above) and, by comparing actor states recorded in trace records generated before and after an action firing, identifies actor state variables that change to derive dependencies between token consumption and actor state uses definitions of an action's guard condition reading an actor state variable and that action's defined output port to derive dependencies between actor state change(s) and token production In many instances, various related states and tokens of the actor are distributed among a plurality of trace records. This can occur, for example, as a result of the asynchronous behavior of other actors (or of the debugged actor itself), which causes related information to be collected at different times. Consequently, in order to ensure that all relevant state and token information for the actor being debugged has been found, the debugging tool 213 ascertains whether the state and token data associated with the actor is complete (decision block 405). If not, the trace records must be further investigated to find the state and token data that will further fill in the gaps. Consequently ("NO" path out of decision block 405), debugging tool processing is directed back to step 401 so that the process of finding additional related records and augmenting the actor's state and token information with this found information will be repeated.

At some point, the actor's state and token information has been completely assembled, meaning that all tokens and local actor state information relating to the actor's firing have been collected in the debugging tool's representation of this consistent information. When this occurs ("YES" path out of decision block 405), and assuming that it is desired to display this information to a user (it may not be, for example, if the collection of this information is merely an intermediate step in a process of reverting a plurality of actors to a particular firing), the assembled state and token data is displayed to the user (step 407), for example as token and state information in the token input and output regions 307, 305 as well as in the actor state region 311. An updated actor timeline can also be displayed (step 409). By this is meant that the actor's firings are displayed with current position within these firings being somehow indicated to the user, for example by displaying some information in bold font and horizontally aligned in the token output and input regions 305, 307 and actor state region 311. (See this illustrated in FIG. 3.) This allows the user to select an action firing to revert to.

Following the optional display of information to the user, the debugging tool ascertains whether further reversion of the actor's firing(s) is/are requested by the user or by other software (decision block 411). If so ("YES" block out of decision block 411) debugging tool processing passes back to step 401 so that the entire process can be repeated as described above.

If no further reversion of the actor's firing(s) is/are requested by the user or by other software ("NO" block out of decision block 411), then this processing ends.

In another aspect of embodiments consistent with the invention, the debugging tool 213 is configured to interact with a user (e.g., via the input and output devices 207, 209) and, based on these interactions, to ascertain and provide to the user information that is useful for debugging a network of a dataflow program. This includes information that enables the user to backtrack a potentially faulty actor and/or action within the context of the dataflow network (or a portion thereof). The debugging process can be iterative in that, after backtracking the dataflow program to a particular reversion point (i.e., a point at which consistent token and state information is made available to the user), the user can select another represented object (e.g., an actor, token, or state presented in the user interface) to backtrack from based on a tree of prerequisite objects whose existence led up to the existence of the newest (original) context from which backtracking commenced. This other object can be, for example, a different actor from which the user has the option of continuing debugging forward (i.e., switching to a user interface such as the graphical user interface 300) or moving to any other point in the trace records 215 (e.g., making a new selection from the set of recorded tokens, not just those that are prerequisites of the current token).

Figure 5:
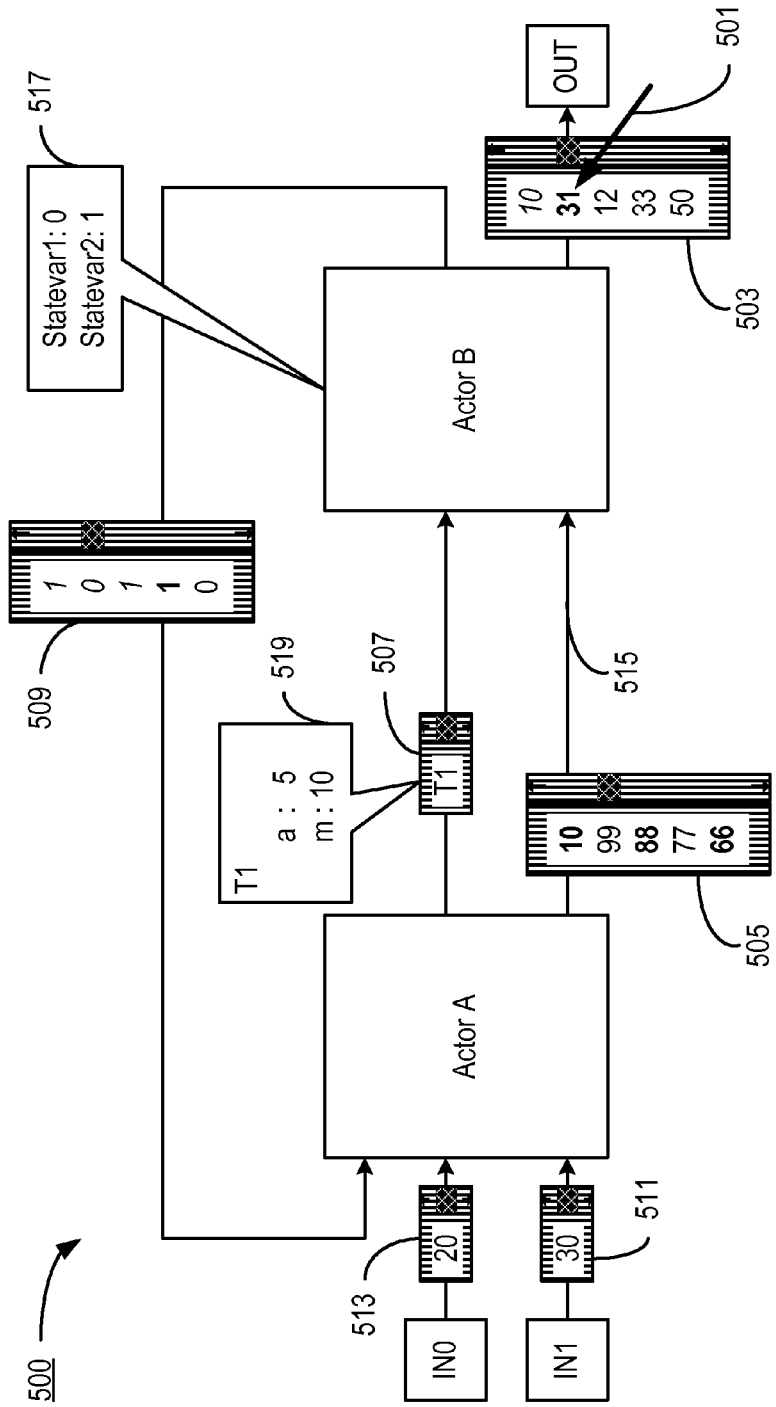
FIG. 5 depicts an exemplary graphical user interface for local debugging of an actor within the context of a dataflow network, whereby the user is made able to examine various states and related tokens throughout the network.

To enable this type of debugging (i.e., at the dataflow network level), the debugging tool 213 is configured to provide the user with a user interface that allows the local debugging of an actor within the context of the dataflow network, whereby the user is made able to examine various states and related tokens throughout the network. FIG. 5 depicts an exemplary graphical user interface 500 for this type of dataflow program debugging. If a suspicious state is discovered or when investigating whether an actor's input tokens are at fault, the user can revert related states and tokens on ports throughout the network to those that existed at earlier points in time. (These are generally not the same point in time, since what is displayed are, for example, tokens whose presence at an input port is related to an action firing that resulted in a subsequent token appearing at that actor's output port.) This arrangement is due to the execution schedule being data driven, such that each action is fired only when its prerequisites are fulfilled. The debugging tool 213 therefore provides a means for finding the cause of these prerequisites being fulfilled. For example, and without limitation, this can be due to a certain number of tokens having arrived at an input port or ports of an actor, and/or due to one or more state variables having changed.

This "cause finding" of prerequisites fulfillment can then be done iteratively until the user reaches the actor and action firing that is potentially the root cause of the faulty token or state. The debugging tool 213 enables the user to branch out the search to many different actors. At this point, techniques described above with respect to debugging a single actor can by applied to the potentially faulty actor. Compared with control flow reverse execution techniques, only the relevant parts of the dataflow program need to be reverted to (an) earlier state(s) because it is only necessary to revert the schedule of execution of those tokens/states that cause prerequisite fulfillment.

Looking at the graphical user interface 500 more closely, two interconnected actors are illustrated, denoted "Actor A" and "Actor B". (In the general case, the number of actors that can be depicted is not restricted to two.) It can be seen that an icon representing a pointer 501 is made visible to the user. Using any technique known in the art, the debugging tool 213 is configured to enable the user to move the pointer 501 within the display and to make selections of pointed-to items by means of manipulation of one or more of the input devices 207 (e.g., by moving a mouse and pressing mouse buttons).

The exemplary graphical user interface 500 depicts the interconnections between Actor A and Actor B, and also displays scrollable lists 503, 505, 507, 509, 511, 513, each displayed in a manner that indicates its association of a respective one of the connections within the dataflow program (e.g., by depicting the scrollable list in closer proximity to (e.g., in contact with) the associated connection than to any other connection). For example, the scrollable list 505 is in contact with the connection 515, and is therefore displayed in a manner that informs the user of its association with token values that passed on the connection 515.

When the user hovers the pointer 501 over an actor, such as the Actor B, state variables of that actor pop up in a state variable balloon 517. In some but not necessarily all embodiments, double-clicking the actor causes the state variable balloon 517 to remain statically displayed to the user, even when the pointer 501 is moved away from the actor.

In a similar manner, if a token is not merely a scalar (which can be easily displayed within a scroll list, such as in any of the scroll lists 503, 505, 509, 511, 513) but is instead a more complex data structure (e.g., as is shown in the scroll list 507), the name of the token can be indicated in the scroll list, and a token expansion balloon, such as the token expansion balloon 519, can be displayed when the user causes the pointer 501 to hover over the scroll list 507. In some but not necessarily all embodiments, double-clicking the scroll list 507 causes the token expansion balloon 519 to remain statically displayed to the user, even when the pointer 501 is made to move away from the scroll list 507.

The token expansion balloon 519 shows the token name and its constituent parts. The values of those constituent parts are also shown. For example, as shown in FIG. 5, the token "T1" in scroll list 507 is shown by the token expansion balloon 519 to be a data structure comprising "T1.a" and "T1.m". The value of "T1.a" is the scalar value "5", and the value of "T1.m" is the scalar value "10".

In alternative embodiments, the scroll lists, state variable balloons, and token expansion balloons are not superimposed on the graphical depiction of the dataflow program, but are instead shown in adjacent (sub)-windows with connection link titles (e.g., A.out1→B.In1).

In some but not necessarily all embodiments, in such cases where token expansion is called for, the scroll lists 503, 505, 507, 509, 511, 513 display an index number where, for example, the number "0" represents a present token, negative index values represent past tokens, and positive index values represent future token values.

In some, but not necessarily all embodiments, instead of displaying index values for expandable tokens, compressed/partial values of the tokens' members (i.e., the constituent parts of a complex data structure) are displayed up to the width of the scroll list 503, 505, 507, 509, 511, 513. For example if an output token data structure contains several integer elements, then as many as will fit in the width of the scroll list 503, 505, 507, 509, 511, 513 is displayed, for example with commas or other character separating individual member values from one another. In some but not necessarily all of these embodiments, a horizontal scroll capability (not shown, but well known in the art of graphical user interfaces) allows all of the token member values to fit in this compressed form.

In response to the user selecting a token value (e.g., the value "31" depicted in scroll list 503), the other depicted scroll lists scroll to the last value upon which the selected token is dependent. This dependence can be indicated to the user by, for example, indicating related token values in bold, such as the values "10", "88", and "66" shown in scroll list 505. The dependency structure information derived by the debugging tool 213 (see earlier discussion) is used to process one or more trace records to derive the related token(s) for the scroll list 505. This example illustrates that the debugging tool's usefulness is not restricted to only those cases in which there is a one for one correspondence between consumption of an input token and production of an output token. To the contrary, any number of tokens consumed in sequence on a given port might be required to produce a token on an output port. For example, in the illustrated case of FIG. 5, suppose that Actor B produces the tokens shown in the scroll list 503 as a function of the three most recent ones of every other token consumed on the connection 515. This means that one token will be produced for every six tokens consumed on connection 515. In the example, the consumed token values on the connection 515 are (in order of consumption) 66, 77, 88, 99, and 10. Taking every alternate one of these means that the tokens having values 66, 88, and 10 were used in the production of the produced token having a value of 31. Hence, the value 31 is depicted in bold (because it is the currently selected token), and the values 66, 88, and 10 are also depicted in bold because they are prerequisite values of the selected token shown in the scroll list 503. If the user of the debugging tool 213 believes that the token value 31 is an error, he or she can then determine whether this value would have been expected based on the input token sequence of 66, 77, 88, 99, and 10. If not, debugging activities can focus on Actor B's behavior to ascertain why it produced an unexpected result. Otherwise, the user of the debugging tool 213 can focus on the token values appearing on connection 515 to ascertain whether they were expected, given the tokens consumed at Actor A's input ports. This debugging process can be continued in an iterative manner until the cause of the problem is located.

If a token is presented at an input port of an actor (or equivalently at an output port of an actor) but is not consumed, this too can be indicated to the user by various techniques. For example, in FIG. 5 this is illustrated by the use of italics, such as the token value "10" in scroll list 503. Alternative methods of displaying this information to the user could be used instead. For example, a grayed font could be used instead of italics.

Figure 6:
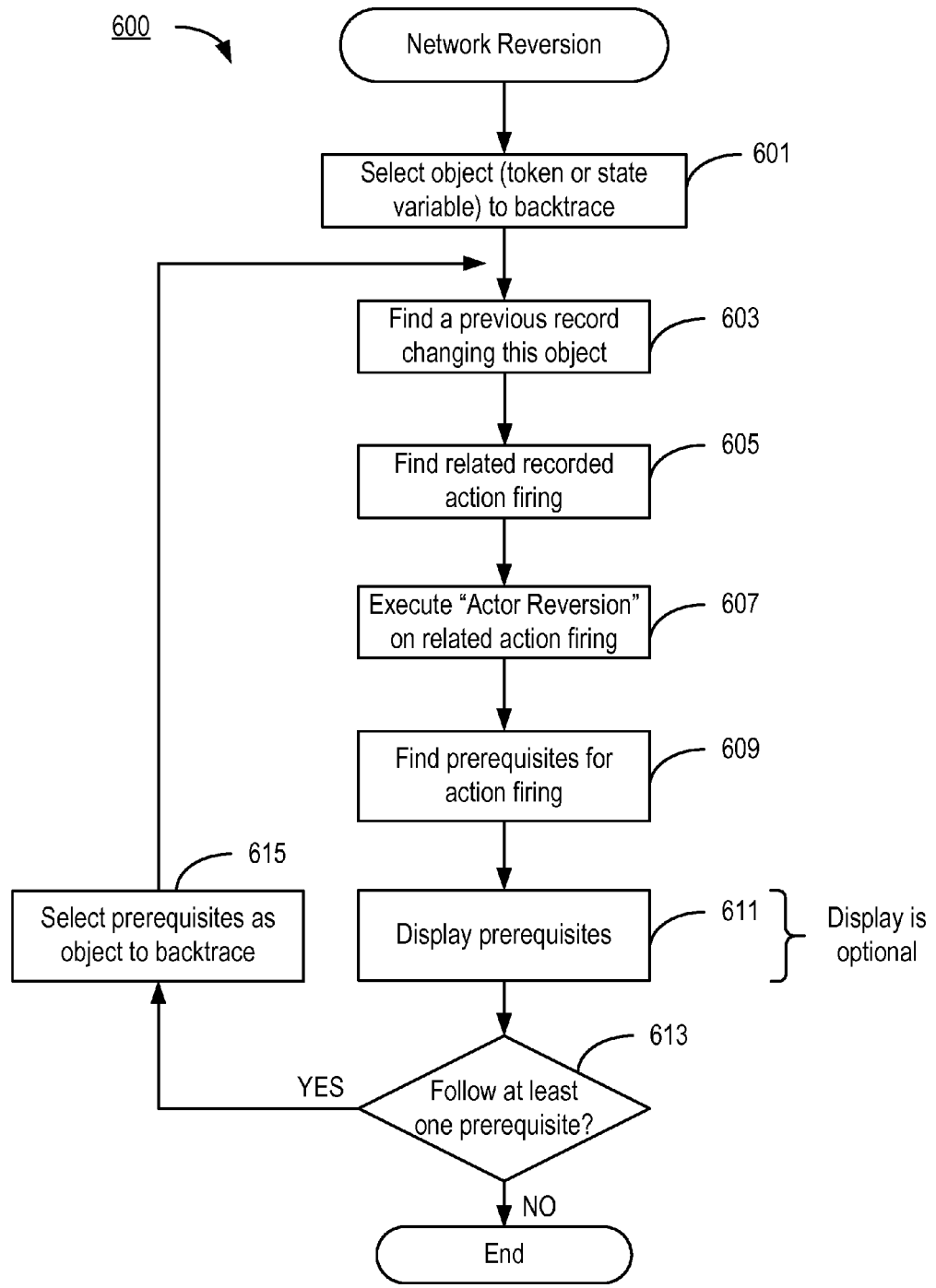
FIG. 6 is, in one respect, a flow chart of steps/processes performed by a debugging tool in accordance with some but not necessarily all exemplary embodiments of the invention.

FIG. 6 is, in one respect, a flow chart of steps/processes performed by a debugging tool 213 in accordance with some but not necessarily all exemplary embodiments of the invention. In another respect, FIG. 6 can be considered to depict exemplary means 600 comprising the various illustrated circuitry (e.g., hard-wired and/or suitably programmed processor) configured to perform the described functions.

In this exemplary embodiment, the debugging tool 213 is configured to facilitate debugging a network of actors within a dataflow program that comprises an interconnected network of one or more actors. The network of actors to be debugged can be the entire set or just a subset of interconnected actors within the dataflow program. The illustrated portion begins with the debugging tool 213 selecting an object (e.g., an actor, a token or a state variable) from which backtracing is to commence (step 601). Selection of the object can either be made directly by the user via, for example, a user interface such as the one described with reference to FIG. 5, or it can be made within the context of the network reversion process 600, as will be described in greater detail below.

Having selected an object from which backtracing will commence, a previous record changing this object is found (step 603). Finding the previous record changing the selected object involves the debugging tool 213 looking through the trace records 215 to identify one associated with the selected object being examined. The trace records 215 are further examined to locate a related recorded action firing (step 605). For example, suppose it is desired to investigate a change in an actor's state variable (i.e., the state variable is the selected object). Having found the change, the trace records 215 are examined to locate the closest previous action firing of the actor. This action firing is, therefore, associated with the change in the state variable. Similarly, suppose that an input token arrived. It would then be necessary to find the chronological position of the state variable change in order to discover during what firing the change was made.

An "Actor Reversion" (e.g., a process such as the one illustrated with reference to FIG. 4) is then carried out on the found related action firing (step 607). Upon completing the Actor Reversion, the dependency structure information derived by the debugging tool 213 (see earlier discussion) is used to identify one or more prerequisites for the action firing (step 609). In some but not necessarily all embodiments, these prerequisites can be displayed (step 611) to the user to assist in the debugging process.

The debugging tool 213 then ascertains (e.g., via user input facilitated by a graphical user interface such as the one shown in FIG. 5) whether at least one of the prerequisites should be further backtraced (decision block 613). If so ("YES" path out of decision block 613), the prerequisites are then selected as a next object to backtrace (step 615) and debugger processing is directed back to step 603, from which steps proceed for the newly selected object as described above. However, if no prerequisites should be further backtraced ("NO" path out of decision block 613), then network reversion is complete.

In the context of both actor debugging (e.g., as in FIGS. 3 and 4) and/or dataflow program debugging/dataflow network reversion (e.g., as in FIGS. 5 and 6), to further handle the situation when a potentially faulty state or token has been found (i.e., in a reverted position), the debugging tool 213 includes circuitry (e.g., hardwired and/or programmed processor circuitry) configured to receive input from the user by which the user manually edits values and/or states. The user can then cause the debugging tool 213 to replay/re-execute the action firing order with the new state/token data. This is subject to a requirement that the firing prerequisites are still fulfilled. If a condition is reached in which the prerequisites are not fulfilled, then normal scheduling methods are used. This technique is useful for examining whether a change will result in the proper execution at a later action, before altering the code.

Figure 7:
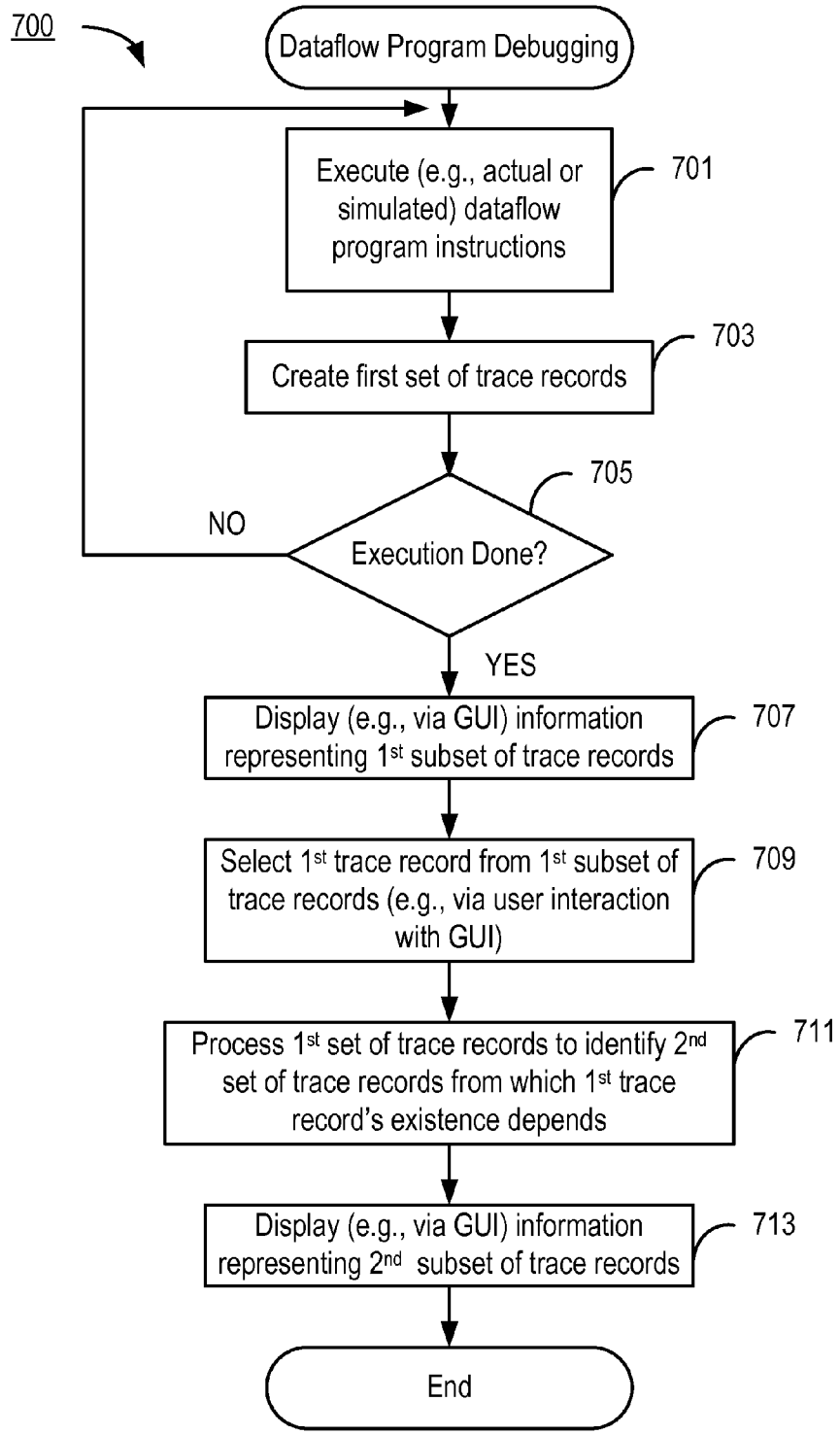
FIG. 7 illustrates high level functionality of a dataflow program debugging tool and is, in one respect, a flow chart of steps/processes performed by a dataflow program debugging tool in accordance with some but not necessarily all exemplary embodiments of the invention.

FIG. 7 illustrates high level functionality of the debugging tool 213 and is, in one respect, a flow chart of steps/processes performed by a debugging tool 213 in accordance with some but not necessarily all exemplary embodiments of the invention. In another respect, FIG. 7 can be considered to depict exemplary means 600 comprising the various illustrated circuitry (e.g., hard-wired and/or suitably programmed processor) configured to perform the described functions.

Processing begins with some form of execution of the dataflow program (step 701). As explained in detail earlier, this execution can be in the intended target hardware of the dataflow program, in a simulator, or any other environment that allows the dataflow program to fire actions and generate and consume tokens in its intended data-driven manner. As used herein, the term "execution" therefore means any of the above possibilities and their equivalents.

As the dataflow program is being executed, a first set of trace records are created and stored in a memory (step 703). The debugging tool 213 therefore needs to interact with the dataflow program in some manner to achieve this result, and this can be achieved in any of a number of ways. As stated earlier, the debugging tool 213 can be configured as part of a simulator, so that program execution is simulated and the firings and token production/consumption can be easily observed and recorded. At the other extreme, the dataflow program is actually run on processing hardware in its actually intended runtime environment, in which case, the debugging tool 213 may have embedded its own instructions into that of the dataflow program, wherein the embedded instructions record the action firings and token production/consumption events as they take place. Embedded instructions can also cause traps to be taken which allow debugging tool software to examine and record various aspects of actor states and token production/consumption of the running dataflow program as they are taking place.

The debugging tool 213 monitors for a cessation of program execution (decision block 705), and keeps monitoring and creating trace records as long as execution continues ("NO" path out of decision block 705). As used herein, the term "cessation" is intended to include not only program execution reaching an endpoint specified by the dataflow program itself, but also other program execution halts such as, but not limited to, manual halts initiated by the user, and breakpoint halts that occur when program execution encounters a breakpoint that was set by a user.

When execution has stopped ("YES" path out of decision block 705), a first subset of the first set of trace records is displayed to a user (e.g., via a Graphical User Interface— "GUI") (step 707). It is advantageous to include a representation of a last-generated record in the first subset, although this is not a requirement in all embodiments. Such an embodiment is particularly suitable when the program is halted based on a breakpoint, since it is likely that, in such cases, the user will want to see the last thing that happened. Using the GUI, the user has an opportunity to interact with the data collected during program execution and to select, from the first subset of trace records, one of the trace records (e.g., a trace record relating to a produced/consumed token or actor state) for observation (step 709). Then, as shown in step 711, the debugging tool 213 processes the first set of trace records to identify a second set of one or more trace records from which the first trace record's existence depends (i.e., "dependence" in this case means that the first trace record came into existence during the execution of the dataflow program as a result of information (e.g., a token, state, or action firing) represented by the identified second set of trace records). A second subset of trace records is then displayed to the user, wherein the second subset of trace records is a subset of the second set of trace records (step 713). The determination of which of the second set of trace records will be included in the second subset of trace records can be, in some but not necessarily all embodiments, based on how much information can be represented in the user interface. It may not be possible to fit representations of all of the second set of trace records on the display.

The described debugging process can be repeated for as long as the user cares to select tokens and states to be observed and backtraced.

The various embodiments of the dataflow program debugging tool 213 provide the dataflow program writer with a beneficial tool that works directly with dataflow concepts, and thereby enables reduced debugging (and hence product development) time compared to conventional techniques. This advantage is achieved via, for example, the ability to leverage dataflow concepts as tokens and runtime scheduled execution order in order to isolate debugging to smaller code sets. Embodiments also benefit the user by enabling him or her to backtrace from the originating actor that produced a faulty token or state to identify the source of the problem.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of processing a dataflow program that defines one or more actors and one or more connections, wherein each connection passes a token from an output port of any one of the actors to an input port of any one of the actors, the method comprising:

causing one or more processors to access and execute instructions of the dataflow program;

as instructions of the dataflow program are being executed, creating a first set of trace records that represents a sequence of events, wherein each event is a token production by an actor, a token consumption by an actor, an actor state change, or an actor action firing;

displaying information representative of a first subset of trace records from the first set of trace records;

providing a selected first trace record by selecting a first trace record from the first subset of trace records;

processing the first set of trace records to identify, based on definitions specified by the dataflow program, a second set of trace records from which the selected first trace record's existence depends, wherein the second set of trace records is a subset of the first set of trace records and the second set of trace records represents a chain of causality of events leading up to an event represented by the selected first trace record;

displaying information representative of a second subset of trace records, wherein the second subset of trace records is a subset of the second set of trace records, thereby enabling tracing of one or more events that caused the selected first trace record to come into existence during the course of dataflow program execution, displaying, as part of a graphical user interface, one or more actors and one or more actor connections defined by the dataflow program; and displaying, as part of the graphical user interface, a depiction of the selected first trace record in closer proximity to a related one of the displayed actor connections than to all other displayed actor connections, wherein the selected first trace record represents a token that, during execution of the dataflow program, was produced to or consumed from the related actor connection.

2. The method of claim 1, wherein selecting the first trace record from the first subset of trace records comprises:

displaying the graphical user interface on a display device, wherein the graphical user interface display includes a depiction of the first subset of trace records;

receiving, via the graphical user interface, information indicative of a trace record depicted on the display device;

using the indicated trace record depicted on the display device as the selected first trace record from the first subset of trace records.

3. The method of claim 2, comprising:

displaying, via the graphical user interface, the information representative of the second subset of trace records in a manner that visually depicts an association between the selected first trace record and the second subset of the second set of trace records.

4. The method of claim 3, comprising:

displaying, via the graphical user interface, information representative of a third subset of trace records that is different from the first and second subsets of trace records.

5. The method of claim 1, comprising:

displaying a graphical user interface on a display device, wherein:

the graphical user interface display includes information representative of program code defining an action of an actor defined by the dataflow program;

the first subset of trace records includes a record representing a token produced by a firing of the action of the actor; and the second subset of trace records includes a record representing a token that was a prerequisite of the firing of the action of the actor.

6. The method of claim 5, wherein the displayed graphical user interface further includes information representative of one or more actor state changes related to the action.

7. The method of claim 1, wherein:

the second subset of trace records includes a second trace record representing a prerequisite of the selected first trace record; and the second subset of trace records includes a third trace record representing a prerequisite of the second trace record.

8. The method of claim 1, comprising:

performing the selecting and processing steps for each of a plurality of actors that are defined by the dataflow program.

9. The method of claim 1, wherein processing the first set of trace records to identify, based on definitions specified by the dataflow program, the second set of trace records from which the selected first trace record's existence depends comprises any one or more of the following steps:

using connections between various actors' output and input ports, as defined by the dataflow program, to derive dependencies between token production and token consumption, using one or more of action input definitions, output port definitions and token repetitions, as defined by the dataflow program, to derive dependencies between relationships between consumption of a token and production of the same or a different token, using one or more of actors' defined input ports and token repetitions and identifying actor state variables that change in a recorded actor state before and after action firing, as defined by the dataflow program, to derive dependencies between token consumption and actor state changes, and using an action's guard condition reading an actor state variable and an action's defined output port, as defined by the dataflow program, to derive dependencies between one or more actor state changes and token production.

10. An apparatus for processing a dataflow program that defines one or more actors and one or more connections, wherein each connection passes a token from an output port of any one of the actors to an input port of any one of the actors, the apparatus comprising:

circuitry configured to cause one or more processors to access and execute instructions of the dataflow program;

circuitry configured to create a first set of trace records as instructions of the dataflow program are being executed, wherein the first set of trace records represents a sequence of events, wherein each event is a token production by an actor, a token consumption by an actor, an actor state change, or an actor action firing;

circuitry configured to display information representative of a first subset of trace records from the first set of trace records;

circuitry configured to provide a selected first trace record by selecting a first trace record from the first subset of trace records;

circuitry configured to process the first set of trace records to identify, based on definitions specified by the dataflow program, a second set of trace records from which the selected first trace record's existence depends, wherein the second set of trace records is a subset of the first set of trace records and the second set of trace records represents a chain of causality of events leading up to an event represented by the selected first trace record;

circuitry configured to display information representative of a second subset of trace records, wherein the second subset of trace records is a subset of the second set of trace records, thereby enabling tracing of one or more events that caused the selected first trace record to come into existence during the course of dataflow program execution, circuitry configured to display, as part of the graphical user interface, one or more actors and one or more actor connections defined by the dataflow program; and circuitry configured to display, as part of the graphical user interface, a depiction of the selected first trace record in closer proximity to a related one of the displayed actor connections than to all other displayed actor connections, wherein the selected first trace record represents a token that, during execution of the dataflow program, was produced to or consumed from the related actor connection.

11. The apparatus of claim 10, wherein the circuitry configured to select the first trace record from the first subset of trace records comprises:
circuitry configured to display the graphical user interface on a display device, wherein the graphical user interface display includes a depiction of the first subset of trace records;
circuitry configured to receive, via the graphical user interface, information indicative of a trace record depicted on the display device;
circuitry configured to use the indicated trace record depicted on the display device as the selected first trace record from the first subset of trace records.

12. The apparatus of claim 11, comprising:
circuitry configured to display, via the graphical user interface, the information representative of the second subset of trace records in a manner that visually depicts an association between the selected first trace record and the second subset of the second set of trace records.

13. The apparatus of claim 12, comprising:
circuitry configured to display, via the graphical user interface, information representative of a third subset of trace records that is different from the first and second subsets of trace records.

14. The apparatus of claim 10, comprising:
circuitry configured to display a graphical user interface on a display device, wherein:
the graphical user interface display includes information representative of program code defining an action of an actor defined by the dataflow program;
the first subset of trace records includes a record representing a token produced by a firing of the action of the actor; and
the second subset of trace records includes a record representing a token that was a prerequisite of the firing of the action of the actor.

15. The apparatus of claim 14, wherein the displayed graphical user interface further includes information representative of one or more actor state changes related to the action.

16. The apparatus of claim 10, wherein:
the second subset of trace records includes a second trace record representing a prerequisite of the selected first trace record; and
the second subset of trace records includes a third trace record representing a prerequisite of the second trace record.

17. The apparatus of claim 10, wherein the circuitry configured to select the first trace record and the circuitry configured to process the first set of trace records are configured to operate for each of a plurality of actors that are defined by the dataflow program.

18. The apparatus of claim 10, wherein the circuitry configured to process the first set of trace records to identify, based on definitions specified by the dataflow program, the second set of trace records from which the selected first trace record's existence depends comprises any one or more of the following:
circuitry configured to use connections between various actors' output and input ports, as defined by the dataflow program, to derive dependencies between token production and token consumption,
circuitry configured to use one or more of action input definitions, output port definitions and token repetitions, as defined by the dataflow program, to derive dependencies between relationships between consumption of a token and production of the same or a different token,
circuitry configured to use one or more of actors' defined input ports and token repetitions and identifying actor state variables that change in a recorded actor state before and after action firing, as defined by the dataflow program, to derive dependencies between token consumption and actor state changes, and
circuitry configured to use an action's guard condition reading an actor state variable and an action's defined output port, as defined by the dataflow program, to derive dependencies between one or more actor state changes and token production.

19. A non-transitory computer readable medium having stored thereon a set of program instructions that, when executed by one or more processors, cause the one or more processors to perform a method of processing a dataflow program that defines one or more actors and one or more connections, wherein each connection passes a token from an output port of any one of the actors to an input port of any one of the actors, the method comprising:
causing one or more processors to access and execute instructions of the dataflow program;
as instructions of the dataflow program are being executed, creating a first set of trace records that represents a sequence of events, wherein each event is a token production by an actor, a token consumption by an actor, an actor state change, or an actor action firing;
displaying information representative of a first subset of trace records from the first set of trace records;
providing a selected first trace record by selecting a first trace record from the first subset of trace records;
processing the first set of trace records to identify, based on definitions specified by the dataflow program, a second set of trace records from which the selected first trace record's existence depends, wherein the second set of trace records is a subset of the first set of trace records and the second set of trace records represents a chain of causality of events leading up to an event represented by the selected first trace record;
displaying information representative of a second subset of trace records, wherein the second subset of trace records is a subset of the second set of trace records, thereby enabling tracing of one or more events that caused the selected first trace record to come into existence during the course of dataflow program execution,
displaying, as part of a graphical user interface, one or more actors and one or more actor connections defined by the dataflow program; and
displaying, as part of the graphical user interface, a depiction of the selected first trace record in closer proximity to a related one of the displayed actor connections than to all other displayed actor connections, wherein the selected first trace record represents a token that, during execution of the dataflow program, was produced to or consumed from the related actor connection.

* * * * *